United States Patent Office 3,257,522
Patented June 21, 1966

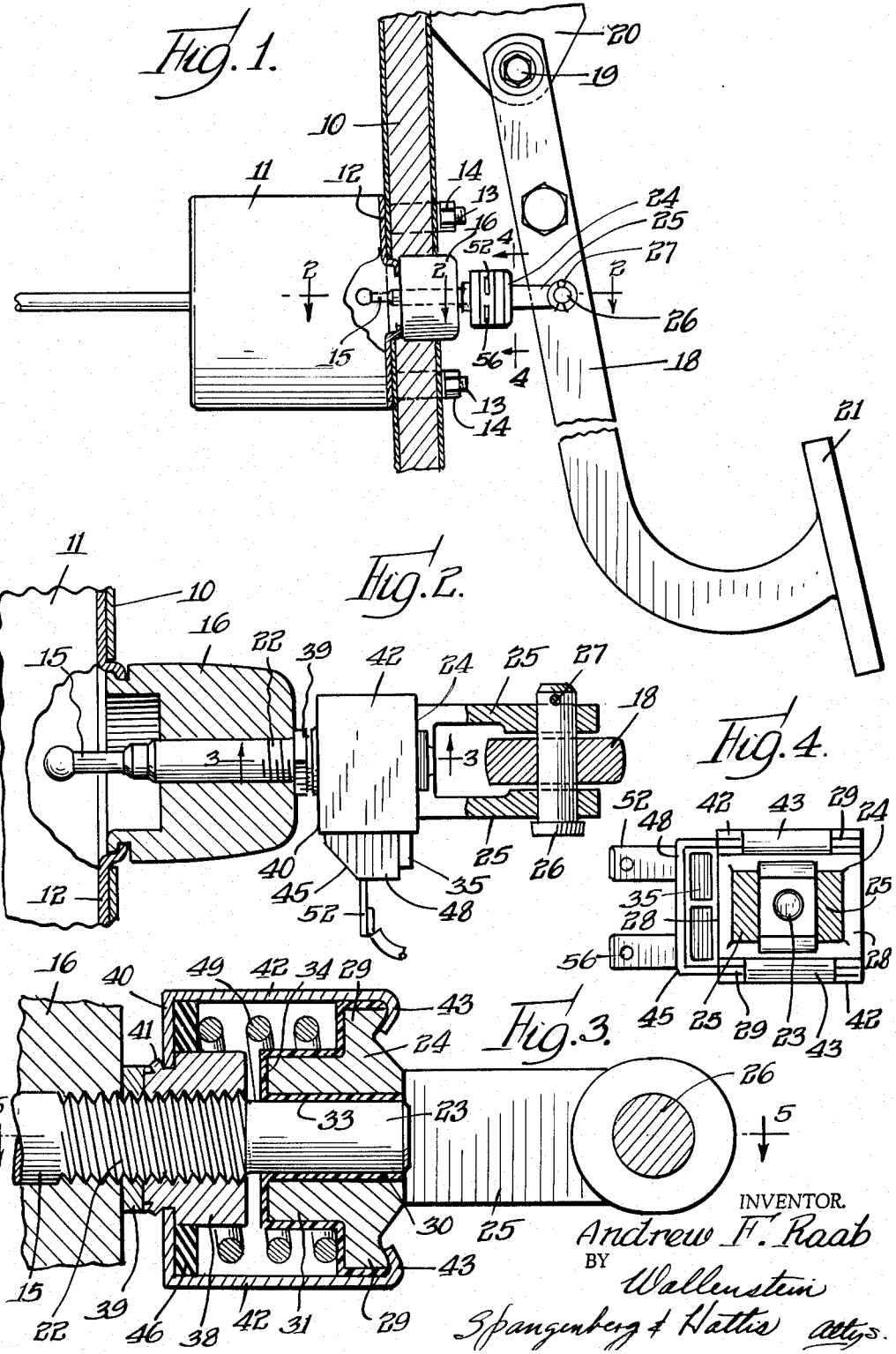

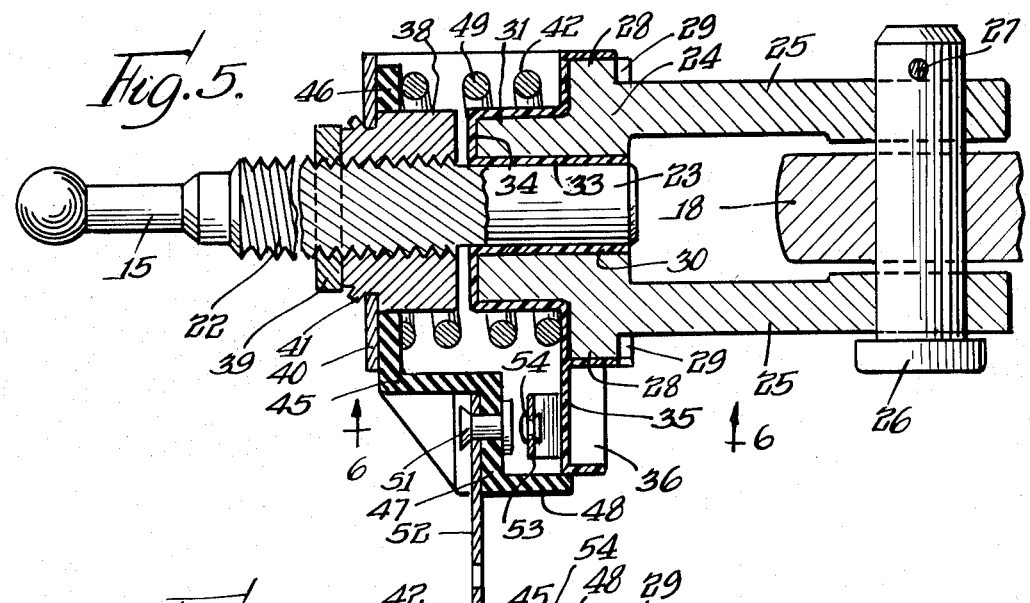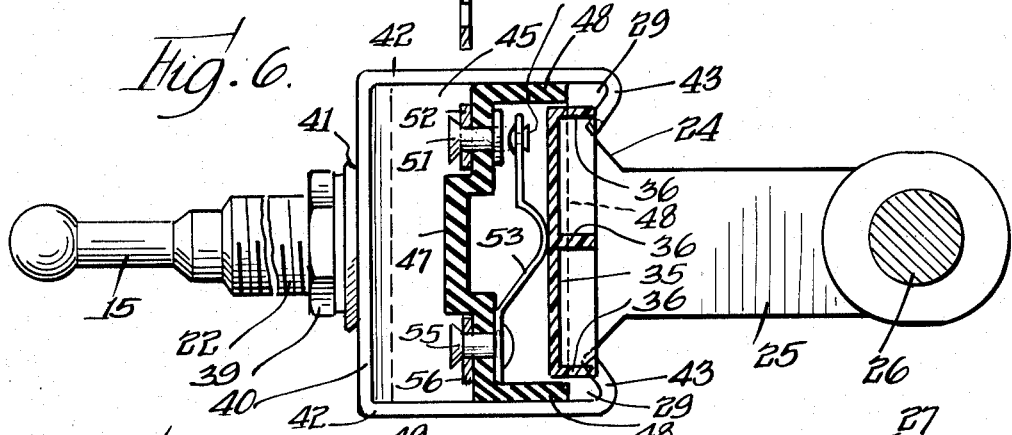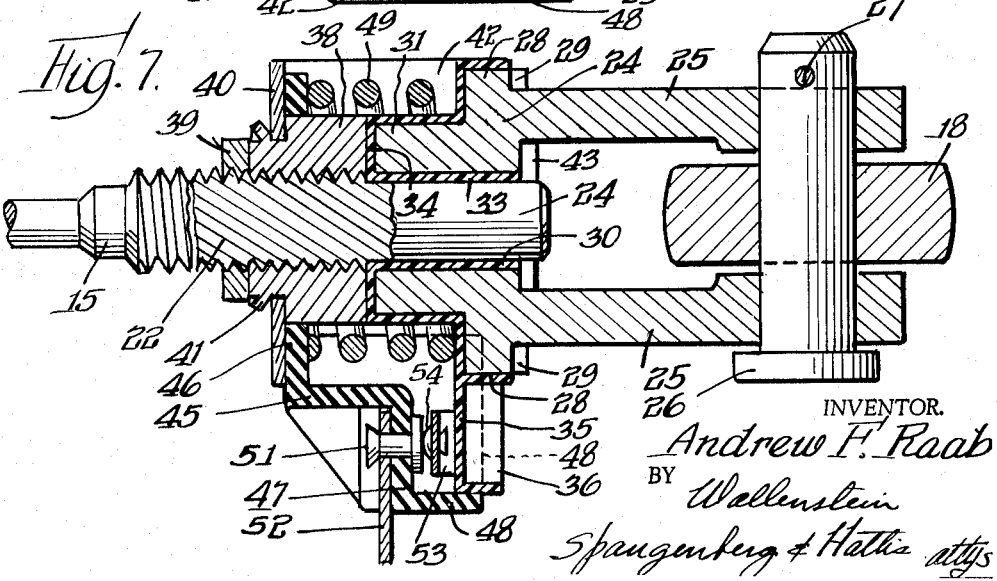

3,257,522
LINK AND SWITCH DEVICE FOR AUTOMOTIVE
BRAKING SYSTEMS
Andrew F. Raab, Morton Grove, Ill., assignor to Littelfuse, Inc., Des Plaines, Ill., a corporation of Illinois
Filed Aug. 9, 1962, Ser. No. 215,866
6 Claims. (Cl. 200—61.89)

Automotive vehicles are conventionally provided with a brake mechanism, such as a power brake mechanism or mechanically operated hydraulic brake mechanism, a brake pedal connected to the brake mechanism for operating the same, and with a switch controlled stoplight for indicating the operation of the brake mechanism. Conventionally, the switch for controlling the stop light is of two types. One type is a normally open pressure responsive switch having a diaphragm or the like responding to the pressure of the fluid in the brake mechanism, the fluid pressure increasing as the brake pedal is depressed for braking purposes and operating to close the stoplight switch to illuminate the stoplight during braking. The other type is a normally closed mechanically operated switch operated by the brake pedal, the brake pedal opening the switch when it is released and allowing the switch to close when the brake pedal is depressed.

Both of these types of stop light switches, although they have been utilized for many years, have major inherent defects. In the case of said one type of pressure responsive switch, leakage at the diaphragm or the like often occurs, rendering the switch inoperative and causing loss of braking fluid. Also, when the brake pedal is tramped on suddenly with considerable force, extremely high fluid pressures are developed in the brake mechanism which rupture the diaphragm or the like of the pressure responsive switch also to render the same inoperative and to cause loss of braking fluid.

While these defects are not present in the case of said other type of mechanically operated switch, still other major defects are here involved. In the first place, the switch must be accurately adjustably positioned with respect to the brake pedal so that it may close when the brake pedal is depressed sufficiently to cause the brake mechanism to provide the appropriate braking action. Also, the throw of the brake pedal will vary from time to time, as for example, when the vehicle brakes wear or the volume or pressure of braking fluid changes, and in order to obtain proper signalling of the braking action by the stoplight, it is necessary to make adjustments from time to time of the position of the switch with respect to the brake pedal. Improper adjustment in one direction results in faulty tardy illumination of the stoplight or even no illumination at all, and in the other direction results in faulty continuous illumination or premature illumination when the brake pedal is only partly depressed and before braking is actually applied. In this latter situation flashing of the stoplight often occurs when the brake mechanism is producing no braking action.

The principal object of this invention is to provide a combination link and switch device, which is mechanically incorporated between the brake mechanism and the brake pedal, which eliminates the aforementioned defects of the conventional stoplight switch arrangements, which positively operates the brake mechanism, which positively illuminates the stop light only when the brake pedal is depressed sufficiently with sufficient force to cause the brake mechanism to provide a braking action, which is independent from the fluid conditions in the brake mechanism, which is independent from the throw of the brake pedal, which provides for adjustment of the throw of the brake pedal without affecting the control of the stoplight, which is simple and rugged in construction and foolproof in operation, and which is inexpensive to manufacture and install.

Briefly, in its broader aspects, the combination link and switch device of this invention, for operating the brake mechanism and illuminating the stoplight when the brake pedal is depressed, includes a pair of relatively movable members, such as telescoping members, connected respectively to the brake mechanism and the brake pedal and provided with engageable or aligned abutting surfaces. A normally open switch is carried by one of the members exteriorly and out of the confines of the same for controlling the illumination of the stoplight, and a switch actuator is carried by the other of said members exteriorly and out of the confines of the same. A spring is connected between theses members for normally separating the engageable or abutting surfaces thereof and allowing the switch to open, limiting means being preferably provided for limiting the separation of the engageable or abutting surfaces. When the brake pedal is depressed sufficiently and with sufficient force to overcome the spring (which force is required to cause operation of the brake mechanism), the telescoping members are relatively moved to engage the engageable or abutting surfaces thereof and to close the switch, whereupon substantially simultaneous operation of the brake mechanism and illumination of the stoplight are positively provided. Further depression of the brake pedal causes both telescoping members to move together to increase the braking action produced by the brake mechanism.

Preferably, a bushing is adjustably secured to the telescoping member or push rod which is connected to the brake mechanism, and this adjustable bushing which carries the engageable abutting surface of that member and the limiting means, is engaged by the spring and carries the switch. As a result, by adjustably positioning this bushing on this member, the effective length of the telescoping members may be adjusted for adjusting the throw of the brake pedal without in any way affecting the positive control of the illumination of the stoplight.

The normally open switch carried by the bushing preferably includes a contact and a spring switch blade normally separated from the contact but adapted to engage the contact when pushed by the switch actuator. A synthetic plastic bearing member is preferably arranged between the telescoping members to facilitate relative sliding movement thereof and it is also preferably provided with a flange arranged between the engageable or abutting surfaces to cushion the engagement of those surfaces when the brake pedal is depressed. This bearing member which is carried by the telescoping member connected to the brake pedal is also preferably provided with a projection which acts as the actuator for closing the switch.

Further objects of this invention reside in the details of construction of the link and switch device and in the cooperative relationships between the component parts thereof.

Other objects and advantages of this invention will become apparent to those skilled in the art upon reference to the accompanying specification, claims and drawings in which:

FIG. 1 is a partial elevational view, partly in section, illustrative the firewall of an automotive vehicle, a braking mechanism, a brake pedal and the link and switch device of this invention interposed between the braking mechanism and the brake pedal;

FIG. 2 is a somewhat enlarged horizontal sectional view taken substantially along the line 2—2 of FIG. 1;

FIG. 3 is an enlarged vertical sectional view taken substantially along the line 3—3 of FIG. 2;

FIG. 4 is an enlarged vertical sectional view taken substantially along the line 4—4 of FIG. 1;

FIG. 5 is a horizontal sectional view taken substantially along the line 5—5 of FIG. 3 and illustrating the switch in open position and the brake pedal released;

FIG. 6 is a vertical sectional view taken substantially along the line 6—6 of FIG. 5; and FIG. 7 is a sectional view similar to FIG. 5 but illustrating the switch closed and the brake pedal depressed.

Referring first to FIG. 1 a firewall of an automotive vehicle is generally designated at 10, the firewall carrying a portion of the brake mechanism 11. The brake mechanism may be of the power brake type or the mechanically operated hydraulic brake type and the control portion thereof may be provided with a mounting flange 12 by which it is suitably secured to the power plant side of the firewall 10 by suitable studs 13 and nuts 14. The control portion of the braking mechanism is controlled by a push rod 15 in the usual fashion, the push rod 15 extending through a resilient sealing member 16 suitably secured in place on the mounting flange 12 of the brake mechanism and extending through a suitable opening in the firewall 10.

A brake pedal 18, which is arranged in the compartment side of the firewall 10, is suitably pivoted at 19 to a bracket 20 carried by the firewall 10, it being provided with a foot engaging member 21. The brake pedal 18 is normally held in released position by a spring or other means and is moved to brake applying position by applying foot pressure to the foot-engaging portion 21 thereof.

The push rod 15 is suitably secured at one end to the control portion of the brake mechanism 11, is provided intermediate its ends with a screw threaded portion 22 and is provided at its other end with a cylindrical telescoping portion 23. A clevis 24 is slidably telescopically received on the telescoping end 23 of the push rod 15 and it is provided with a pair of outwardly extending bifurcated portions 25 which embrace the foot pedal 18. A pin 26 extending through suitable holes in the bifurcated portions 25 of the clevis and in the brake pedal 18 operates to pivotally attach the clevis 24 to the brake pedal 18, the pin 26 being held in place by a suitable cotter pin 27 or the like.

The clevis 24 is substantially rectangular in cross section where the bifurcated portions 25 extend therefrom, it being provided on its opposite vertical sides with straight side surfaces 28 and on its horizontal sides with straight rim portions 29. The clevis 24 is provided with a central hole 30 which slidably telescopically receives the end 23 of the push rod 15 and it is also provided with a substantially cylindrical boss 31 extending from the clevis 24 in a direction opposite from the bifurcated portions 25. The cylindrical portion 31 provides a spring seat and the end of the cylindrical portion provides an engageable or abutting surface.

A bearing member formed of a suitable synthetic plastic material, such as nylon or the like, is suitably secured to the clevis 24, as by cementing or the like. This bearing member has a tubular bearing portion 33 interposed between the hole 30 in the clevis 24 and the end portion 23 of the push rod 15 for the purpose of facilitating the sliding telescopic movement of the clevis member with respect to the push rod. It also includes a substantially annular portion 34 overlying the engageable or abutting surface of the clevis 24 so as to cushion the engagement of the engageable or abutting surface with another engageable or abutting surface to be described hereafter. The bearing member also extends over the sides of the clevis 24 and is provided with a projection 35 reinforced by ribs 36 which extends outwardly beyond the confines of the clevis and operates as an actuator for a switch to be described hereafter.

A bushing 38 is adjustably screw threadedly mounted on the screw threaded portion 22 of the push rod 15 so that by rotating the same the longitudinal position thereof with respect to the push rod may be adjusted. The bushing 38 is locked in adjusted position on the push rod 15 by a suitable lock nut 39. A generally U-shaped bracket 40 is suitably secured to the bushing 38, it being preferably staked in place thereon as indicated at 41. The arms 42 of the bracket 40 extend longitudinally along the bushing 38 and the clevis 24 and they are provided with tabs 43 which extend over the rim portions 29 of the clevis 24 so as to limit the separation of the bushing 38 and the clevis 24. The bushing 38 is provided on its inner end with an engageable or abutting surface which is adapted to abut the engageable or abutting surface of the clevis 24 when the clevis 24 is slidably moved on the push rod 15 to engage the bushing 38, the annular portion 34 of the bearing member cushioning this abutting engagement. A terminal board 45 formed of suitable synthetic plastic material, such as a phenolic material or the like, has a portion 46 encompassing the bushing 38 and engaging the bracket 40. A spring 49 is interposed between this portion 46 of the terminal board 45 and the clevis 24 for normally separating the bushing 38 and the clevis 24 as shown in FIGS. 3 and 5. However, when pressure is applied to the foot pedal 18 sufficiently to overcome the action of the spring 49, the engageable or abutting surface of the clevis 24 is moved into engagement with the engageable or abutting surface of the bushing 38 as shown in FIG. 7.

The terminal board 45 is also provided with a laterally extending terminal portion 47 and side flanges 48 which extend outwardly beyond the confines of the bushing and which movably receive the actuator portion 35 of the bearing member. A contact 51 is suitably riveted in place in a hole in the terminal portion 47 and the contact carries a terminal 52. A resilient switch blade 53 having a contact 54 adapted to engage the contact 51 is secured in place on the terminal portion 47 of the terminal board 45 by a rivet 55 which also carries a terminal 56. The terminals 52 and 56 are suitably connected in series with the stoplight of the automotive vehicle so as to control the illumination thereof. The switch blade 53 normally separates the contacts 54 and 51, as illustrated in FIGS. 5 and 6, so as to open the circuit to the stop light when the clevis 24 and the bushing 38 are separated by the spring 49. When, however, pressure is applied to the brake pedal 18 so as to overcome the action of the spring 49 to engage the abutting surface of the clevis 24 and the bushing 38, as illustrated in FIG. 7, the actuator portion 35 of the bearing member carried by the clevis 24 moves the switch blade 53 to engage the contacts 54 and 51 to close the circuit to the stoplight for illuminating the same.

The braking effort, afforded by the depression of the brake pedal 18, is transmitted from the clevis 24 through the engageable or abutting surfaces of the clevis 24 and the bushing 38 to the push rod 15 for applying the brakes. Since there is a large and rugged contacting surface between the clevis 24 and the bushing 38, extremely high braking forces may be transferred from the brake pedal to the brake mechanism, and the clevis 24 and push rod 15 are also guided and held in alignment by the telescopic relation of the clevis and the push rod, this telescopic guiding being facilitated by the portion 33 of the bearing member. Also, the portion 34 of the bearing member operates effectively to cushion the engagement of the engageable or abutting surface of the clevis 24 and the bushing 38. The spring 49 is selected in accordance with the type of brake mechanism to be controlled and operated. For example, in the case of a power operated brake a 25 lb. spring is preferably used while in the case of a conventional mechanical hydraulic brake a 60 lb. spring is preferably used, these respective pressures being necessary for operating the respective brake systems to provide a braking action. Thus, the engageable or abutting surfaces of the clevis 24 and the bushing 38 cannot be engaged until sufficient braking effort is applied to the brake pedal in order to cause braking action by the brake mechanism. Accordingly, the switch for controlling the stop light is not closed to illuminate the stoplight until sufficient effort is applied to the brake pedal to cause a braking action. As a result, faulty illumination of the stoplight is entirely prevented. Since the stoplight controlling switch is separate from the abutting surfaces of the clevis 24 and the push rod 15, none of the force required to apply the brakes is transmitted through the switch, the force being transmitted solely through the abutting surfaces. As a result, the switch performs only its switching function while the abutting surfaces perform the braking function.

The throw or position of the brake pedal 18 may be readily adjusted by adjustably positioning the bushing 38 on the push rod 15 to change the effective length of the push rod and clevis as desired. Since the switch is carried by the bushing 38, and not the push rod 15, the relation between the switch and its actuator 35 carried by the clevis 24 is not in any way affected by adjusting the throw of the brake pedal, this relationship being maintained fixed by the engageable or abutting surfaces and the limit means afforded by the bracket 42. Accordingly, the link and switch device of this invention may be adjusted to regulate the throw or position of the brake pedal 18 without in any way affecting lumination of the stoplight.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. In an automotive vehicle having a brake mechanism requiring at least a predetermined pressure to be applied thereto for applying the brakes, a brake pedal for applying pressure to the brake mechanism, a stoplight for indicating the operation of the brake mechanism, a pair of relatively movable members connected respectively to the brake mechanism and the brake pedal and having normally separated but engageable surfaces which are engaged when the member connected to the brake pedal is moved at least a predetermined distance by depression of the brake pedal for moving the member connected to the brake mechanism for applying pressure to the brake mechanism, the improvement comprising, a normally open switch carried by one of said members and arranged exteriorly and out of the confines of said members for controlling the illumination of the stoplight, a switch actuator arranged exteriorly and out of the confines of said members and operated by the other of said members, and a spring operatively connected between said members for normally separating the engageable surfaces thereof and allowing the switch to open, said spring having sufficient strength to prevent engagement of the engageable surfaces until pressure equivalent to the predetermined pressure required to operate the brake mechanism is applied by the brake pedal, depression of the brake pedal with at least such pressure relatively moving said members against the action of the spring to engage the engageable surfaces thereof, to close the switch and to move both of said members to operate the brake mechanism.

2. In an automotive vehicle having a brake mechanism requiring at least a predetermined pressure to be applied thereto for applying the brakes, a brake pedal for applying pressure to the brake mechanism, a stoplight for indicating the operation of the brake mechanism, a pair of relatively movable members connected respectively to the brake mechanism and the brake pedal and having normally separated but engageable surfaces which are engaged when the member connected to the brake pedal is moved at least a predetermined distance by depression of the brake pedal for moving the member connected to the brake mechanism for applying pressure to the brake mechanism, the improvement comprising, a synthetic plastic bearing interposed between the members to facilitate relative movement thereof, a normally open switch carried by one of said members and arranged exteriorly and out of the confines of said members, for controlling the illumination of the stoplight, a switch actuator arranged exteriorly and out of the confines of said members and operated by the other of said members, and a spring operatively connected between said members for normally separating the engageable surfaces thereof and allowing the switch to open, said spring having sufficient strength to prevent engagement of the engageable surfaces until pressure equivalent to the predetermined pressure required to operate the brake mechanism is applied by the brake pedal, depression of the brake pedal with at least such pressure relatively moving said members against the action of the spring to engage the engageable surfaces thereof and to close the switch and to move both of said members to operate the brake mechanism.

3. In an automotive vehicle having a brake mechanism requiring at least a predetermined pressure to be applied thereto for applying the brakes, a brake pedal for applying pressure to the brake mechanism, a stoplight for indicating the opertaion of the brake mechanism, a pair of relatively movable members connected respectively to the brake mechanism and the brake pedal and having normally separated but engageable surfaces which are engaged when the member connected to the brake pedal is moved at least a predetermined distance by depression of the brake pedal for moving the members connected to the brake mechanism for applying pressure to the brake mechanism, the improvement comprising, a synthetic plastic bearing interposed between the engageable surfaces to cushion the engagement of the engageable surfaces of the members, a normally open switch carried by one of said members and arranged exteriorly and out of the confines of said members for controlling the illumination of the stoplight, a switch actuator arranged exteriorly and out of the confines of said members and operated by the other of said members, and a spring operatively connected between said members for normally separating the engageable surfaces thereof and allowing the switch to open, said spring having sufficient strength to prevent engagement of the engageable surfaces until pressure equivalent to the predetermined pressure required to operate the brake mechanism is applied by the brake pedal, depression of the brake pedal with at least such pressure relatively moving said members against the action of the spring to engage the engageable surfaces thereof and to close the switch and to move both of said members to operate the brake mechanism.

4. In an automotive vehicle having a brake mechanism requiring at least a predetermined pressure to be applied thereto for applying the brakes, a brake pedal for applying pressure to the brake mechanism, a stoplight for indicating the operation of the brake mechanism, a pair of relatively movable members connected respectively to the brake mechanism and the brake pedal and having normally separated but engageable surfaces which are engaged when the member connected to the brake pedal is moved at least a predetermined distance by depression of the brake pedal for moving the members connected to the brake mechanism for applying pressure to the brake mechanism, the improvement comprising, a normally open switch carried by one of said members and arranged exteriorly and out of the confines of said members for controlling the illumination of the stoplight and including a contact and a spring switch blade normally separated from said contact but adapted to engage said contact, a switch actuator arranged exteriorly and out of the confines of said members and operated by the other of said members and adapted to engage the switch blade to close the switch, and a spring operatively connected between said members for normally separating the engageable surfaces thereof and allowing the switch to open, said spring having sufficient strength to prevent engagement of the engageable surfaces until pressure equivalent to the predetermined pressure required to operate the brake mechanism is applied by the brake pedal, depression of the brake pedal with at least such pressure relatively moving said members against the action of the spring to engage the engageable surfaces thereof and to close the switch and to move both of said members to operate the brake mechanism.

5. In an automotive vehicle having a brake mechanism requiring at least a predetermined pressure to be applied thereto for applying the brakes, a brake pedal for applying pressure to the brake mechanism, a stoplight for indicating the operation of the brake mechanism, a push rod member connected at one end to the brake mechanism and having an engageable surface adjacent its other end, a clevis member connected to the brake pedal and slidably receiving said other end of the push rod member and having an engageable surface adapted to engage the engageable surface of the push rod member, said engageable surfaces being normally separated but being engaged when the clevis member is moved at least a predetermined distance by depression of the brake pedal for moving the push rod member for applying pressure to the brake mechanism, the improvement comprising, a normally open switch carried by one of said members and arranged exteriorly and out of the confines of said member for controlling the illumination of the stoplight, a switch actuator arranged exteriorly and out of the confines of said members and operated by the other of said members, and a spring operatively connected between the push rod member and the clevis member for normally separating the engageable surfaces thereof and allowing the switch to open, said spring having sufficient strength to prevent engagement of the engageable surfaces until pressure equivalent to the predetermined pressure required to operate the brake mechanism is applied by the brake pedal, depression of the brake pedal with at least such pressure moving the clevis member with respect to the push rod member against the action of the spring to engage the engageable surfaces thereof and to close the switch and to move both the clevis member and the push rod member to operate the brake mechanism.

6. In an automotive vehicle having a brake mechanism requiring at least a predetermined pressure to be applied thereto for applying the brakes, a brake pedal for applying pressure to the brake mechanism, and a stoplight for indicating the operation of the brake mechanism, a push rod connected at one end to the brake mechanism, a bushing member adjustably secured to the push rod intermediate its ends and having an engageable surface, a clevis member connected to the brake pedal and slidably receiving the other end of the push rod and having an engageable surface adapted to engage the engageable surface of the bushing member, said engageable surfaces being normally separated but being engaged when the clevis member is moved at least a predetermined distance by depression of the brake pedal for moving the bushing member and the push rod for applying pressure to the brake mechanism, the improvement comprising, a normally open switch carried by one of said members and arranged exteriorly and out of the confines of said members for controlling the illumination of the stoplight, a switch actuator arranged exteriorly and out of the confines of said members and operated by the other of said members, and a spring operatively connected between the bushing member and the clevis member for normally separating the engageable surfaces thereof and allowing the switch to open, adjustment of the bushing member with respect to the push rod adjusting the effective length of the push rod and clevis member without affecting the operation of the switch, said spring having sufficient strength to prevent engagement of the engageable surfaces until pressure equivalent to the predetermined pressure required to operate the brake mechanism is applied by the brake pedal, depression of the brake pedal with at least such pressure moving the clevis member with respect to the push rod against the action of the spring to engage the engageable surfaces and to close the switch and to move both the clevis member and the push rod to operate the brake mechanism.

References Cited by the Examiner
UNITED STATES PATENTS

| | | | |
|---|---|---|---|
| 1,844,731 | 2/1932 | Whittingham | 200—16 |
| 2,067,681 | 1/1937 | Rockwell | 200—61 |
| 2,244,834 | 6/1941 | Freeman | 200—61 |
| 2,276,028 | 3/1942 | Dick | 200—82 |
| 2,292,378 | 8/1942 | Jensen | 200—82 |
| 2,540,420 | 2/1951 | Bordelon | 200—159 |
| 2,610,237 | 9/1952 | Benner | 200—159 |
| 2,836,669 | 5/1958 | Rosenberg | 200—61 |
| 2,863,010 | 12/1958 | Riedl | 200—159 |
| 2,881,278 | 4/1959 | Gores | 200—159 |
| 3,105,884 | 10/1963 | Cottrell | 200—61 |

BERNARD A. GILHEANY, *Primary Examiner*.

ROBERT K. SCHAEFER, *Examiner*.

BENJAMIN DOBECK, *Assistant Examiner*.